W. NOYES, Jr.
MACHINE FOR SHAVING HORN.
No. 66,247. Patented July 2, 1867.
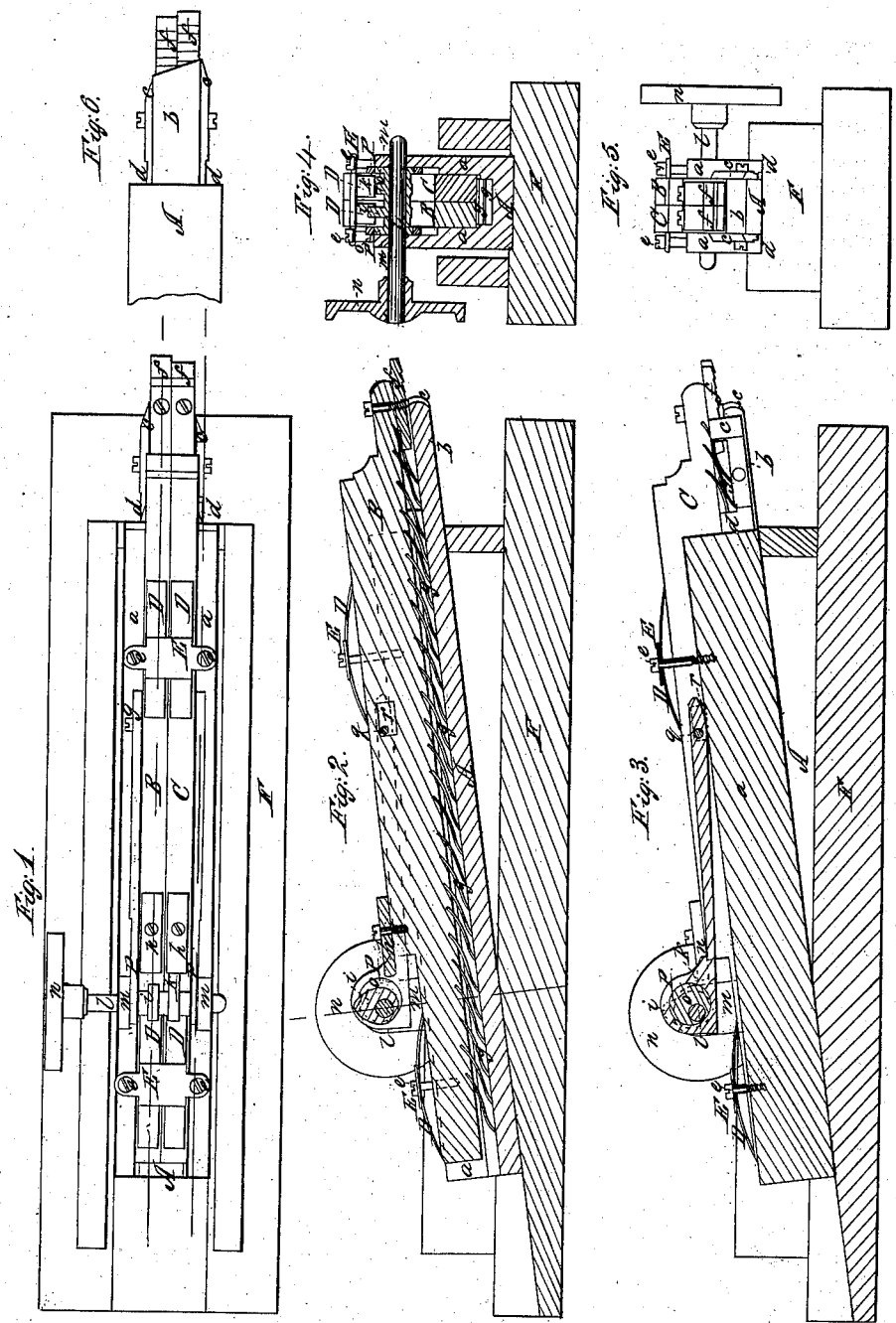
Witnesses:
Inventor:
William Noyes.
by his attorney

United States Patent Office.

WILLIAM NOYES, JR., OF NEWBURYPORT, MASSACHUSETTS.

Letters Patent No. 66,247, dated July 2, 1867.

IMPROVEMENT IN MACHINES FOR SHAVING HORN.

*The Schedule referred to in these Letters Patent and making part of the same.*

TO ALL PERSONS TO WHOM THESE PRESENTS SHALL COME:

Be it known that I, WILLIAM NOYES, Jr., of Newburyport, in the county of Essex, and State of Massachusetts, have invented a new and useful Machine for Reducing the Horn of an Animal to a Strip; and I do hereby declare the same to be fully described in the following specification, and represented in the accompanying drawings, of which—

Figure 1 is a top view, and
Figures 2 and 3 are longitudinal sections of it.
Figure 4 is a transverse section of it.
Figure 5 is an elevation, and
Figure 6 an under side view of the front end or part of it.

In such drawings, A denotes the bed-plate of the machine, it being provided with two guide-plates, $a\ a$, arranged parallel to each other, and projected upward from opposite edges of the bed-plate at right angles to such plate. The front end or part $b$ of the bed-plate stands obliquely to each of the edges of the said plate, or makes an acute angle with one of them, as shown in fig. 6, and there are two cutters or knives, $c\ c$, affixed to the opposite edges of the plate, and with their cutting edges close to the extremity of the part $b$. In rear of these knives are two other dressing-knives, $d\ d$, which are arranged on opposite sides of and extend above the bed-plate. Over the bed-plate are two feeders or feed-bars, B C, each of which is forced down toward the bed-plate by means of springs D D, arranged over it and supported by or against two yokes, E E, which in turn are sustained by screws $e\ e$, going through them and into the guide-plates $a\ a$ of the bed-plate. Each of the feeders has a notched jaw, $f$, fixed to it at its front end, and it also has a series of springs, $g\ g\ g$, extending from its lower edge or bottom in manner as represented in figs. 2 and 3. Furthermore, each feeder has a shoulder, $h$, against which one of two cams or wipers, $i\ k$, fixed on a shaft, $l$, is to operate. This shaft is supported in standards $m\ m$, erected on the plates $a\ a$, and is provided with a pulley, $n$, for putting it in revolution. The shaft also has two eccentrics, $o\ o$, fixed to it, which are embraced by two connecting-rods, $p\ p$, arranged with respect to the feeders in manner as represented in the drawings. A screw-pin, $q$, goes through one of the said rods $p\ p$, is screwed into the other, and extends through a slot, $r$, made in each of the feeders, as shown in figs. 2 and 3.

The mechanism above described may be arranged in manner as shown in the drawings, within a trough, F, or vessel to hold a cooling liquid, such as water. The purpose of making the receiving end of the bed oblique, as described, is to enable the horn to be properly adjusted by it for being reduced spirally from base to point. The guide-plates operate to render the edges of the strip parallel to each other. The mechanism, while in operation on a horn, cuts it spirally from the base to the point, it being previously rendered soft by being heated or boiled in oil. The whole horn will be reduced to one long strip, having parallel edges, and being fit to be manufactured into combs or other articles. The base of the horn is to be presented against the two knives $c\ c$, and so that the jaws of the feeders may act on the horn, and, as fast as the strip may be formed, draw it between the feeders and the bed-plate, the rearmost cutters operating to trim off the edges of the strip. In their operation on the strip, the feeders will be alternately driven back on the strip of horn by the cams, and will be simultaneously advanced by the action of the eccentrics and their connecting-rods. Thus, while one feeder may be in the act of being moved back and along the strip of horn, the other feeder will be at rest on the strip, and will prevent it from being moved by the feeder in motion. The several springs extending down from the feeders are to cause the feeders to fit to or bear on the upper surface of the strip of horn, however uneven such may be, or however the horn may vary in thickness.

I claim as my invention for the purpose specified a machine or combination consisting of a bed-plate, A, two cutters $c\ c$, two guide-plates $a\ a$, and two feeders B C, such feeders being provided with springs $g\ g$, and operative mechanism substantially as described.

I also claim the combination of the bed-plate A, cutters $c\ c$, $d\ d$, guide-plates $a\ a$, and the feeders B C, such feeders having springs $g\ g\ g$ arranged to operate with the bed-plate, guides, and knives, substantially as specified.

I also claim the feeding mechanism or combination composed of the two feeders B C, the cams $i\ k$, eccentrics $o\ o$, and connecting-rods $p\ p$, arranged to operate as specified, such feeders having springs $g\ g$, as explained.

I also claim the combination of the cooling-tank or trough F, with the machine, composed as described, of the bed-plate A, its cutters c c, guide-plates a a, and the feeders B C, having spring g g, and being provided with mechanism, as explained, for advancing and retracting such feeders.

I also claim the construction of the receiving end of the bed-plate, viz, as oblique to the edges of the plate, as set forth.

WM. NOYES, Jr.

Witnesses:
GEORGE H. ANDREWS.
F P. HALE, Jr.